(12) United States Patent
Boulton

(10) Patent No.: US 11,106,791 B2
(45) Date of Patent: Aug. 31, 2021

(54) DETERMINING SECURITY RISKS IN BINARY SOFTWARE CODE BASED ON NETWORK ADDRESSES

(71) Applicant: BlackBerry Limited, Waterloo (CA)

(72) Inventor: Adam John Boulton, Wirral (GB)

(73) Assignee: BlackBerry Limited, Waterloo (CA)

(*) Notice: Subject to any disclaimer, the term of this patent is extended or adjusted under 35 U.S.C. 154(b) by 25 days.

(21) Appl. No.: 16/148,757

(22) Filed: Oct. 1, 2018

(65) Prior Publication Data

US 2020/0104493 A1 Apr. 2, 2020

(51) Int. Cl.
*G06F 21/00* (2013.01)
*G06F 21/56* (2013.01)
*G06F 21/57* (2013.01)

(52) U.S. Cl.
CPC .......... *G06F 21/563* (2013.01); *G06F 21/577* (2013.01); *G06F 2221/033* (2013.01)

(58) Field of Classification Search
CPC ........ G06F 21/12; G06F 21/121; G06F 21/50; G06F 21/52; G06F 21/53; G06F 21/55; G06F 21/56; G06F 21/562; G06F 21/563; G06F 21/566; G06F 21/57
See application file for complete search history.

(56) References Cited

U.S. PATENT DOCUMENTS

| | | |
|---|---|---|
| 8,479,161 B2 | 7/2013 | Weigert |
| 8,713,684 B2 | 4/2014 | Bettini et al. |
| 8,732,825 B2 | 5/2014 | Park et al. |
| 8,819,819 B1* | 8/2014 | Johnston ............... G06F 21/53 709/206 |
| 9,329,846 B1 | 5/2016 | August et al. |
| 9,386,463 B1 | 7/2016 | Contino et al. |
| 9,588,877 B1 | 3/2017 | Adir et al. |
| 9,652,617 B1 | 5/2017 | Evans et al. |
| 9,798,884 B1 | 10/2017 | Bishop, III et al. |

(Continued)

FOREIGN PATENT DOCUMENTS

| KR | 20150083627 | 7/2015 |
|---|---|---|
| WO | 2006039351 | 4/2006 |

OTHER PUBLICATIONS

PCT International Search Report and Written Opinion in International Application No. PCT/EP2019/076,254, dated Jan. 3, 2020, 16 pages.

(Continued)

*Primary Examiner* — Edward Zee
(74) *Attorney, Agent, or Firm* — Fish & Richardson P.C.

(57) ABSTRACT

Systems, methods, and software can be used to analyze security risks of a set of binary software code. In some aspects, a computer-implemented method comprises: scanning, by at least one hardware processor, a set of binary software code to identify one or more network addresses accessed by the set of binary software code; for each of the one or more network addresses: determining, by the at least one hardware processor, security level information of the network addresses; and generating, by the at least one hardware processor, a security notification based on the determined security level information for the one or more network addresses, wherein the security notification indicates a security risk of the set of binary software code.

14 Claims, 2 Drawing Sheets

(56) References Cited

U.S. PATENT DOCUMENTS

| | | |
|---|---|---|
| 9,817,974 B1 | 11/2017 | Huang et al. |
| 10,162,966 B1 | 12/2018 | Huang et al. |
| 10,534,914 B2 | 1/2020 | Nakajima et al. |
| 10,657,262 B1 | 5/2020 | Cui et al. |
| 2003/0195861 A1 | 10/2003 | McClure et al. |
| 2003/0217039 A1 | 11/2003 | Kurtz et al. |
| 2004/0010703 A1 | 1/2004 | Kouznetsov et al. |
| 2004/0015728 A1 | 1/2004 | Cole et al. |
| 2004/0078384 A1 | 4/2004 | Keir et al. |
| 2006/0036394 A1 | 2/2006 | Chen et al. |
| 2006/0075468 A1* | 4/2006 | Boney ............... H04L 63/1408 726/2 |
| 2007/0011319 A1 | 1/2007 | McClure et al. |
| 2008/0066180 A1 | 3/2008 | Repasi et al. |
| 2008/0109871 A1 | 5/2008 | Jacobs |
| 2008/0263659 A1 | 10/2008 | Alme |
| 2009/0144698 A1 | 6/2009 | Fanning et al. |
| 2010/0125913 A1 | 5/2010 | Davenport et al. |
| 2010/0241469 A1 | 9/2010 | Weigert |
| 2010/0242028 A1 | 9/2010 | Weigert |
| 2010/0281248 A1 | 11/2010 | Lockhart et al. |
| 2011/0173693 A1 | 7/2011 | Wysopal et al. |
| 2012/0072968 A1 | 3/2012 | Wysopal et al. |
| 2012/0144486 A1 | 6/2012 | Navaraj et al. |
| 2013/0227683 A1 | 8/2013 | Bettini et al. |
| 2013/0298230 A1 | 11/2013 | Kumar et al. |
| 2015/0067148 A1 | 3/2015 | Kim |
| 2015/0172303 A1 | 6/2015 | Humble et al. |
| 2015/0248556 A1 | 9/2015 | Sickendick et al. |
| 2015/0254017 A1 | 9/2015 | Soja et al. |
| 2015/0261955 A1 | 9/2015 | Huang et al. |
| 2015/0304337 A1 | 10/2015 | Nguyen-Tuong et al. |
| 2015/0377961 A1 | 12/2015 | Lin et al. |
| 2016/0094564 A1 | 3/2016 | Mohandas et al. |
| 2016/0099963 A1 | 4/2016 | Mahaffey et al. |
| 2016/0147517 A1 | 5/2016 | Vicovan et al. |
| 2017/0111375 A1 | 4/2017 | Provos et al. |
| 2017/0180370 A1 | 6/2017 | Satoh et al. |
| 2017/0262633 A1 | 9/2017 | Miserendino et al. |
| 2017/0286692 A1 | 10/2017 | Nakajima et al. |
| 2018/0025157 A1 | 1/2018 | Titonis et al. |
| 2018/0121659 A1 | 5/2018 | Sawhney et al. |
| 2018/0218157 A1 | 8/2018 | Price et al. |
| 2018/0225460 A1 | 8/2018 | Nakajima et al. |
| 2018/0260301 A1 | 9/2018 | Podjarny et al. |
| 2018/0349598 A1 | 12/2018 | Harel et al. |
| 2019/0050515 A1 | 2/2019 | Su et al. |
| 2019/0188392 A1 | 6/2019 | El-Moussa et al. |
| 2019/0243964 A1 | 8/2019 | Shukla et al. |
| 2020/0097662 A1 | 3/2020 | Hufsmith et al. |
| 2020/0104490 A1 | 4/2020 | Boulton et al. |
| 2020/0104492 A1 | 4/2020 | Boulton |

OTHER PUBLICATIONS

Extended European Search Report issued in European Application No. 19200590.8 dated Oct. 30, 2019, 6 pages.

Extended European Search Report issued in European Application No. 19200283.0 dated Nov. 12, 2019, 6 pages.

Notice of Allowance issued in United States U.S. Appl. No. 16/148,730 dated Jan. 26, 2021, 6 pages.

Advisory Action issued in United States U.S. Appl. No. 16/148,690 dated Feb. 16, 2021, 3 pages.

Non-Final Office Action issued in United States U.S. Appl. No. 16/148,690 dated Apr. 26, 2021, 31 pages.

* cited by examiner

2

DETERMINING SECURITY RISKS IN BINARY SOFTWARE CODE BASED ON NETWORK ADDRESSES

TECHNICAL FIELD

The present disclosure relates to determining security risks in binary software code based on network addresses.

BACKGROUND

In some cases, software services can be provided by executable binary software code. The binary software code is computer software in a binary format. The computer software can be application software, system software (e.g., an operating system or a device driver), or a component thereof. The binary software code can also be referred to as binary program code, executable code, or object code.

DESCRIPTION OF DRAWINGS

Like reference numbers and designations in the various drawings indicate like elements.

DETAILED DESCRIPTION

In some cases, a software developer can submit software code to a software service platform that is operated by a software provider. The software code can be executed on the software service platform to provide software services to user devices. Alternatively or additionally, the software code can be downloaded to user devices. The software service platform can be implemented in one or more servers, or on a cloud-computing platform.

In some implementations, the software service platform can inspect the software code to assess the security risks of the software code. Security risks can include malicious software code that would harm user devices, expose user information, or a combination thereof. Security risks can also include code that is vulnerable to malicious attacks.

If the binary software code is submitted without the source code, it may be difficult to inspect the binary software code to identify the security risks. The binary software code can include a stream of bytes that are generated by compiling the source code of the software. Thus, the binary software code is not in a readable format and cannot be easily parsed or analyzed.

Different software code may have different levels of vulnerability according to the function that the software code performs. For example, if the software code performs a network communication function, the security of the software code may depend on how the network communication is conducted. For example, if the target network node that the software code accesses uses a sophisticated security protocol in establishing the network communication, there may be a low level of security risk associated with such a network communication. On the other hand, if the target network node does not configure any security protocol, or configure a simple security protocol that is vulnerable for attack, there may be a high level of security risk associated with such a network communication.

Figure 1:
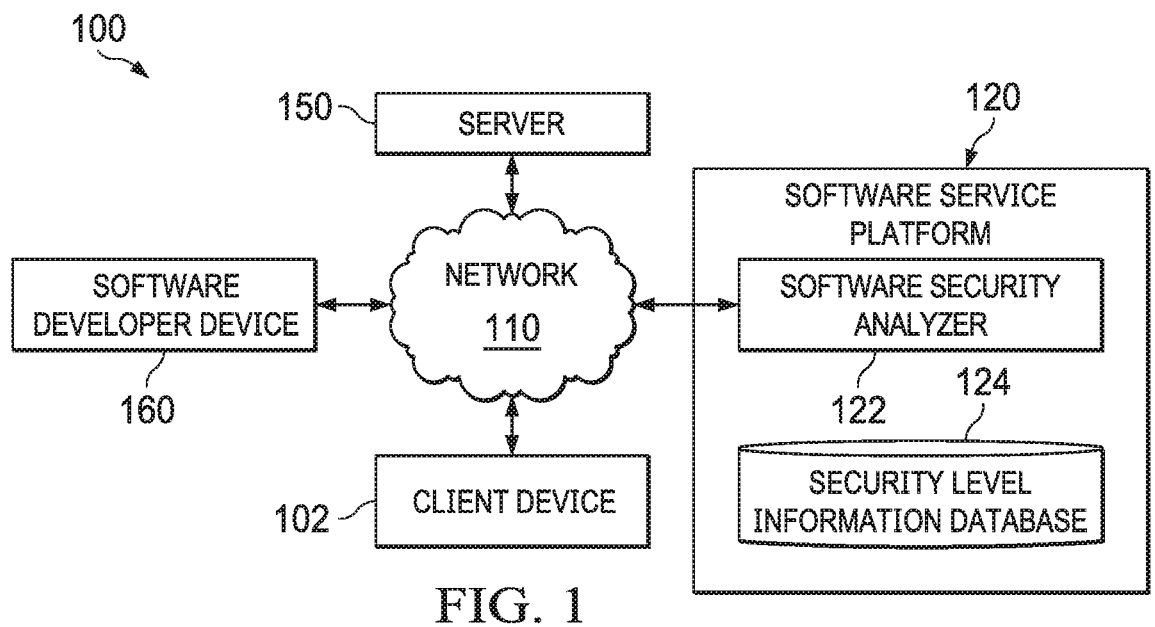
FIG. 1 is a schematic diagram showing an example communication system that determines security risks of binary software code based on network addresses, according to an implementation.
Figure 2:
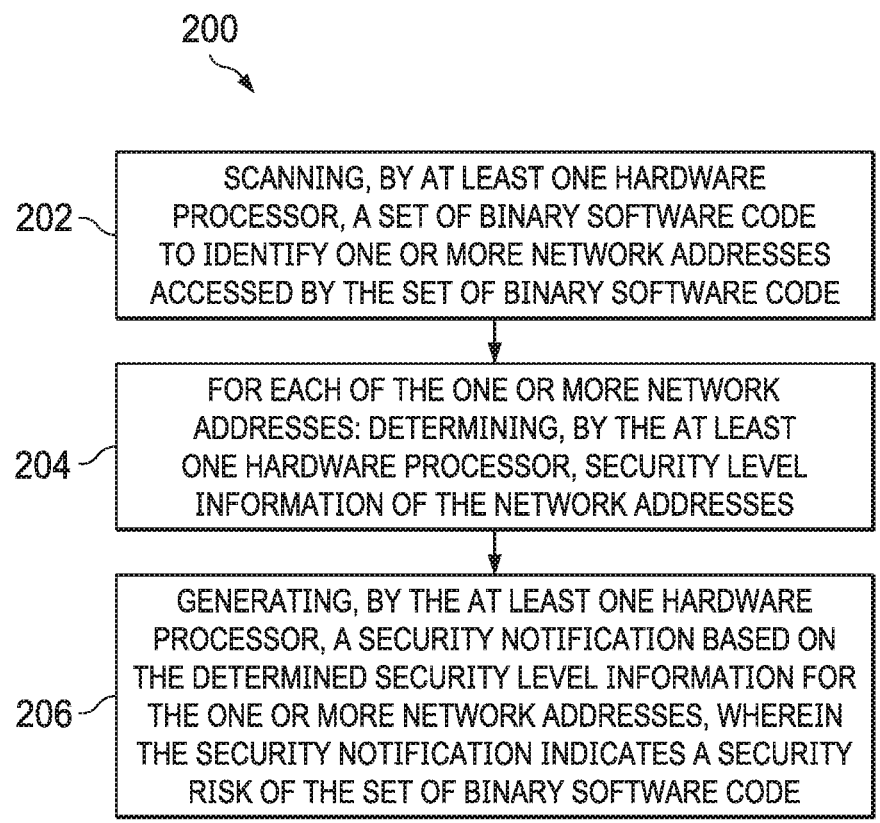
FIG. 2 is a flow diagram showing an example method that determines security risks of binary software code based on network addresses, according to an implementation.
Figure 3:
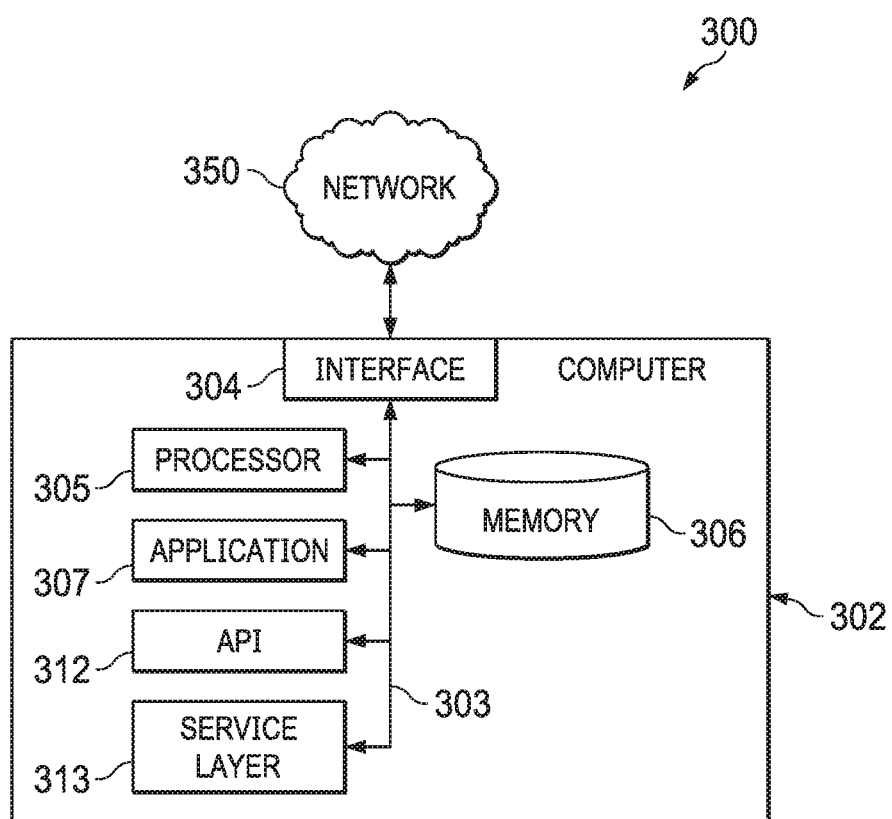
FIG. 3 is a high-level architecture block diagram of a computing system, according to an implementation.

In some implementations, one or more network addresses that are included in a set of binary software code can be identified. The set of binary software code can be the binary software code of a software program, a portion of a software program, or multiple software programs. These network addresses can indicate network entities, e.g., a server that the set of binary software code may have access to when the set of binary software code is executed. The security risk of the set of binary software code can be determined based on these network addresses. In one implementation, an access request can be sent to the network address, and an access response can be received and analyzed to determine the procedures configured by the network entity at the network address for establishing a network connection. The security level information for the network address can be determined based on how the procedure is configured and the type of parameters or credentials that are used. FIGS. 1-3 and associated descriptions provide additional details of these implementations. By performing a dynamic assessment of the security risks based on the network address included in the set of binary software code, the security risks of the set of binary software code can be determined and compared without executing the set of binary software code.

FIG. 1 is a schematic diagram showing an example communication system 100 that determines security risks of binary software code based on network addresses, according to an implementation. At a high level, the example communication system 100 includes a client device 102, a software developer device 160, a server 150, and a software service platform 120 that are communicatively coupled with a network 110.

The software developer device 160 represents an application, a set of applications, software, software modules, hardware, or any combination thereof, that can be configured to submit the set of binary software code to the software service platform 120. The set of binary software code can be downloaded to the client device 102 to be exacted on the client device 102. The set of binary software code can also be executed on the software service platform 120 to provide software service to the client device 102. Examples of the software services can include software as a service (SaaS) applications such as SALESFORCE, OFFICE 365, or other software application services.

The software service platform 120 includes a software security analyzer 122 and a security level information database 124. The software security analyzer 122 represents an application, a set of applications, software, software modules, hardware, or any combination thereof, that can be configured to analyze software code for security risks based on network addresses included in the software code. In some implementations, the software security analyzer 122 can identify one or more network addresses included in the software code, determine security level information for each network address, and determine a security risk of the software code based on the security level information. FIGS. 2-3 and associated descriptions provide additional details of these implementations.

The security level information database 124 represents an application, a set of applications, software, software modules, hardware, or any combination thereof that can be configured to store security level information corresponding to different network addresses. In operation, the software security analyzer 122 can query the security level information database 124 to retrieve security level information corresponding to one or more specific network addresses. The software security analyzer 122 can also store the determined security level information of a network address in the security level information database 124. FIGS. 2-3 and associated descriptions provide additional details of these implementations. In some cases, as illustrated, the security level information database 124 can be implemented on the same platform as the software security analyzer 122. Alternatively or additionally, security level information database 124 can be implemented on a different hardware platform that is accessible to the software security analyzer 122.

The software service platform 120 can be implemented using one or more computers, computer servers, or a cloud-computing platform.

The server 150 represents an application, a set of applications, software, software modules, hardware, or any combination thereof, that can be accessed by the set of binary software code when executed. The server 150 can be an application server, a service provider, or any other network entity that can be accessed at a network address included in the set of binary software code. The server 150 may configure one or more access procedures for a device, e.g., the client device 102 or the software service platform 120, to establish a network connection with the server 150. The server 150 can be implemented using one or more computers, computer servers, or a cloud-computing platform. In some implementations, the software service platform 120 can send an access request to the server 150, and receive an access response from the server 150. The software service platform 120 can determine the security level information for the network address based on the network connection procedure configured at the server 150. FIGS. 2-3 and associated descriptions provide additional details of these implementations.

The client device 102 represents a device that can use the set of binary software code. In some cases, the set of binary software code can be installed on the client device 102, e.g., by downloading over the network 110 or copying locally onto the client device 102. Alternatively, the client device 102 can access a software service provided by the set of binary software code. In one example, a browser or a client application can be executed on the client device 102 to communicate service requests and service responses with the software service platform 120 to obtain software services.

Turning to a general description, the client device 102 may include, without limitation, any of the following: endpoint, computing device, mobile device, mobile electronic device, user device, mobile station, subscriber station, portable electronic device, mobile communications device, wireless modem, wireless terminal, or other electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, vehicle, or other mobile communications devices having components for communicating voice or data via a wireless communication network. A vehicle can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used interchangeably herein.

The example communication system 100 includes the network 110. The network 110 represents an application, set of applications, software, software modules, hardware, or a combination thereof that can be configured to transmit data messages between the entities in the system 100. The network 110 can include a wireless network, a wireline network, the Internet, or a combination thereof. For example, the network 110 can include one or a plurality of radio access networks (RANs), core networks (CNs), and the Internet. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, the fifth generation (5G), or any other radio access technologies. In some instances, the core networks may be evolved packet cores (EPCs).

A RAN is part of a wireless telecommunication system which implements a radio access technology, such as UMTS, CDMA2000, 3GPP LTE, 3GPP LTE-A, and 5G. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components, as appropriate.

FIG. 2 is a flow diagram showing an example method 200 that determines security risks of binary software code based on network addresses, according to an implementation. The method 200 can be implemented by a software service platform, e.g., the software service platform 120 shown in FIG. 1. The method 200 shown can also be implemented using additional, fewer, or different entities. Furthermore, the method 200 can be implemented using additional, fewer, or different operations, which can be performed in the order shown or in a different order.

The example method 200 begins at 202, where a set of binary software code is scanned to identify one or more network addresses accessed by the set of binary software code. In some cases, the set of binary software code is received at a software service platform. In one example, the set of binary software code can be submitted to the software service platform by a software developer, over a network. The set of binary software code can represent an application software, a system software (e.g., an operating system or a device driver), or a component thereof. The set of binary software code can be received without the corresponding source code of the software.

In some implementations, the set of binary software code can be scanned to identify text strings that are encoded in the set of binary software code using one or more encoding protocols. Examples of the encoding protocols include the American Standard Code for Information Interchange (ASCII) encoding protocol or the Unicode protocol. A text string includes one or more consecutive text characters. Examples of the text characters include alphabetic letters, numbers, punctuation marks, and symbols. In some cases, a text character can also be referred to as an alphanumeric character. Each text character is encoded into a binary number according to an encoding protocol. The size of the binary number can be 8 bits (1 byte), 16 bits (2 bytes), 32 bits (4 bytes), or 64 bits (8 bytes). For example, in ASCII protocol, the lower case letter "a" is encoded as 0x61, or "01100001" in binary number. In an encoding protocol, text characters are defined within a range of binary numbers. Therefore, by scanning the byte stream of the set of binary software code to check the values of each byte, two bytes, four bytes, or eight bytes (depending on the size of binary number of the encoding protocol), different text characters can be identified. For text characters that appear consecutively in the set of binary software code, these text characters form a text string. In some cases, the scanning can be performed from the beginning of the set of binary software code (forward scanning), from the end of the set of binary software code (backward scanning), or from both the beginning and the end of the set of binary software code (parallel scanning).

In some cases, the identified text strings that are encoded in the set of binary software code can be used to determine one or more network addresses to which the set of binary software code may perform a network communication. For example, the text strings can include an email address or a Uniform Resource Locator (URL). These text strings can be identified based on a specific character or a specific character string. For example, an email address can be identified by the "@" character in the text string. A URL can be identified by the "HTTP," "HTTPS," or "FTP" characters in the text string. If such a specific character or character string is found in the text strings, the text strings can be parsed to determine a network address. For example, the portion of the text string after the specific character "@" can represent a network address of an email server. The portion of the text string after the specific character string "HTTPS" or "HTTP" can represent a network address of a web server. In one example, the portion of the text string that represents the network address can be in numerical form, e.g., an Internet Protocol (IP) v4 or v6 address. In another example, the portion of the text string that represents the network address can be in letter form, e.g., a Domain Name System (DNS) address that can be translated into an IP address by a DNS server.

In some implementations, in addition to or as an alternative to the scanning, one or more network addresses can also be identified in metadata associated with the set of binary software code. The metadata can be included in the same file as the set of binary software code, e.g., in a header. The metadata can also be included in a separate file, e.g., a software manifest. The metadata can include information of the set of binary software code, including, e.g., the software language used to program the set of binary software code, the computing architecture that executes the set of binary software code, the compiler that was used to compile the source code version of the set of binary software code, the type of network communications that the set of binary software code performs, the target network address that the set of binary software code communicates with, or other information. In some cases, such information of the set of binary software code can be inputted by a software developer through a user interface displayed at the software developer device, and sent to the software service platform when the set of binary software code is submitted to the software service platform.

In some implementations, in addition to or as an alternative to the scanning of the set of binary software code, the set of binary software code can be disassembled into a set of assembly code. The set of assembly code can be parsed into different assembly instructions. The assembly instructions associated with network communications can be identified and the network addresses that are accessed by these assembly instructions can also be identified.

At 204, the software service platform determines security level information for each of the network addresses that are identified for the set of binary software code. In some implementations, the software service platform can determine the security level information for a network address by attempting to establish a network communication with the network address. In one example, the software service platform can transmit an access request directed to the network address, e.g., by including the network address as the target address field in the access request. In response, the software service platform can receive an access response. The access request/response can be messages formatted using a standardized communication protocol. For example, the access request/response can be transmitted and received in accordance with the Internet Control Message Protocol (ICMP) echo request/reply (also known as PING) protocol or the traceroute protocol.

In some implementations, the access request can initiate one or more security procedures configured by the network entity at the network address. For example, the network address can be a network address of a web server. The web server can configure one or more security procedures for any device that attempts to establish a network connection with the web server. In one example, the security procedure can include a redirection to a secured sign-on website. In this example, the network address can be an Internet domain address (in the format of an IP address or a DNS address), and the software service platform can send a Hypertext Transfer Protocol (HTTP) message, e.g., an HTTP get message, as the access request. In response, the web server can send a redirect command as an access response. The redirect command can redirect an entity that initiates the access to the web server to a secured login website, where the entity can provide security credentials, e.g., login name and password, before access can be granted to the entity. In some cases, the secured login website can have an HTTP Secure (HTTPS) address. In some cases, the redirect command can be an HTTP redirect command including a status code that begins with 3, e.g., a 300, 301, 302, 303, 307, or 308 command.

The security level information corresponding to the network address can be determined based on the type of security procedures configured by the network entity at the network address. The security level information can be a numerical value that indicates a score of the security level. The security level information can also be one of several classes, e.g., indicating whether the security level is low, intermediate, or high. For example, if the software service platform determines that a secured login procedure is required before accessing the web server at the network address, the software service platform can set the security level information to a high value. As discussed previously, the software service platform can detect such a configured procedure by detecting that the access response includes a redirect command, an HTTPS address, or a combination thereof. On the other hand, if the software service platform fails to detect the presence of such a procedure, the software service platform can set the security level information to a low value.

In some cases, the network entity at the network address can configure a secured communication establishment procedure according to one or more standardized protocol. For example, a web server can use a Transport Layer Security (TLS) protocol to establish a secured communication. The web server can use the TLS protocol to exchange information such as a certificate, encryption configuration, and authentication configuration with the entity that attempts to access the web server. In these or other cases, the software service platform can detect an initiation of such a procedure based on the access response. In one example, during a handshake procedure, a first device can send a first message to a second device to indicate the cipher suites that is supported by the first device. The second device can send a second message to the first device to indicate whether a connection can be established based on those parameters. The first and second device can be a client device and a server, respectively, or vice versa. In such a procedure, the software service platform can detect the initiation based on detecting a reception of one of these messages that are transmitted together with the access response or after the access response. The software service platform can continue the exchange with the web server, or stop at any point after the software service platform has collected information about the secured communication establishment procedure. The software service platform can set the security level information for the network address based on the type and version of protocol used, the type of certificate of the web server and the issuing authority (e.g., a Certificate Authority) that issues the certificate, the level of encryption and authentication used in the secured communication establishment procedure, and any combinations thereof. For example, the software service platform can set the security level information to a low value if no encryption is configured or if the encryption level is low (e.g., a 128-bit key is used). On the other hand, the software service platform can set the security level information to a high value if the encryption level is high (e.g., a 256-bit key is used).

In some cases, one of more security policies can be configured at the software service platform. The security policies can be configured by an enterprise that operates the software service platform. The security policies can also be configured by the software developer that submits the set of binary software code. The security policies can indicate thresholds or attributes that correspond to a secure network connection. For example, the security policies can include the type or version of security protocol to be used in establishing a secured network connection, minimum encryption level, type of certificate and CA that is required, etc. The software service platform can set the security level information of a network address based on whether the detected communication establishment procedure configured by the network entity at the network address meets the security policy. If the configured procedure meets the security policy, the security level information is set to high (or pass); otherwise, the security level information is set to low (or fail).

In some cases, the software service platform can store the determined security level information for each network address in a database. The security level information database can be implemented on the software service platform or on a different hardware platform that is accessed by the software service platform. In some implementations, the software service platform can also store a timestamp that indicates the time that the security level information is made. In some implementations, after obtaining the list of network addresses accessed by the set of binary software code, the software service platform can look up each network address in the security level information database to determine if the security level information has been determined previously. If the security level information corresponding to that network address is included in the database, the software service platform can retrieve the security level information and use the stored security level information instead of using the access request/response to determine the security level information. In some cases, the software service platform can check the timestamp associated with the stored security level information. If the timestamp indicates that the duration from the time that the stored security level information was determined to the present time exceeds a duration threshold, the software service platform can discard the stored security level information and determine the security level information for that network address using the procedure previously discussed (e.g., access request/response). The software service platform can store the updated determined security level information and timestamp in the database. If the timestamp indicates that the duration from the time that the stored security level information was determined to the present time does not exceed the duration threshold, the software service platform can use the stored security level information. In some cases, the duration threshold can be configured by the enterprise that operates the software service platform or by the software developer that submits the set of binary software code.

At 206, a security notification is generated based on the determined security level information. The security notification indicates the security risk of the set of binary software code. The security risk is determined based on the security level information for each of the network addresses included in the set of binary software code. In some cases, the security notification can include an overall assessment of the security risk, e.g., based on a statistical function of the security level information for different network addresses (by taking an average or taking the worst security level information). Alternatively or additionally, the security notification can include the security level information corresponding to all the network addresses included in the set of binary software code, or some of the network addresses, e.g., those that fail to meet the security policy discussed previously.

In some cases, the security notification can be outputted at the software service platform, e.g., displayed on a graphic user interface on the software service platform. This approach enables an enterprise that operates the software service platform to be informed of security risks of the software submitted to the platform. In some cases, the enterprise that operates the software service platform can enforce policies regarding the software security of codes on the platform. For example, the software service platform can include, or be coupled with, an app store for a device to download the software code, or a software as a service (SaaS) server that provides software service using the software code. If the security notification indicates that the set of binary software code is relatively unsafe, the software service platform can prevent the set of binary software code from being available to devices for use or download.

Alternatively or additionally, the security notification can be transmitted to the software developer device that submits the set of binary software code. This approach enables the software developer to make modifications accordingly.

FIG. 3 is a high-level architecture block diagram showing a computer 302 coupled with a network 350, according to an implementation. The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 350 facilitates communications between the computer 302 and other devices. In some cases, a user, e.g., an administrator, can access the computer 302 from a remote network. In these or other cases, the network 350 can be a wireless or a wireline network. In some cases, a user can access the computer 302 locally. In these or other cases, the network 350 can also be a memory pipe, a hardware connection, or any internal or external communication paths between the components.

The computer 302 includes a computing system configured to perform the algorithm described in this disclosure. For example, the computer 302 can be used to implement the software security analyzer 122 shown in FIG. 1. The computer 302 can also be used to implement other computing devices, e.g., the software developer device 160 or the client device 102 shown in FIG. 1. In some cases, the algorithm can be implemented in an executable computing code, e.g., C/C++ executable codes. Alternatively, or in combination, the algorithm can be implemented in an application program, e.g., EXCEL. In some cases, the computer 302 can include a standalone LINUX system that runs batch applications. In some cases, the computer 302 can include mobile or personal computers that run the application program.

The computer 302 may include an input device, such as a keypad, keyboard, touch screen, microphone, speech recognition device, or another device that can accept user information, and/or an output device that conveys information associated with the operation of the computer 302, including digital data, visual and/or audio information, or a GUI.

The computer 302 can serve as a client, network component, a server, a database or other persistency, or the like. In some implementations, one or more components of the computer 302 may be configured to operate within a cloud-computing-based environment.

At a high level, the computer 302 is an electronic computing device operable to receive, transmit, process, store, or manage data and information. According to some implementations, the computer 302 may also include or be communicably coupled with an application server, e-mail server, web server, caching server, streaming data server, business intelligence (BI) server, and/or other server.

The computer 302 can receive requests over network 350 from a client application (e.g., executing on a user device) and respond to the received requests by processing said requests in an appropriate software application. In addition, requests may also be sent to the computer 302 from internal users (e.g., from a command console or by another appropriate access method), external or third parties, other automated applications, as well as any other appropriate entities, individuals, systems, or computers.

Each of the components of the computer 302 can communicate using a system bus 303. In some implementations, any and/or all the components of the computer 302, both hardware and/or software, may interface with each other and/or the interface 304 over the system bus 303, using an application programming interface (API) 312 and/or a service layer 313. The API 312 may include specifications for routines, data structures, and object classes. The API 312 may be either computer language-independent or -dependent and refer to a complete interface, a single function, or even a set of APIs. The service layer 313 provides software services to the computer 302. The functionality of the computer 302 may be accessible for all service consumers using this service layer. Software services, such as those provided by the service layer 313, provide reusable, defined business functionalities through a defined interface. For example, the interface may be software written in JAVA, C++, or other suitable language providing data in Extensible Markup Language (XML) format or other suitable format. While illustrated as an integrated component of the computer 302, alternative implementations may illustrate the API 312 and/or the service layer 313 as stand-alone components in relation to other components of the computer 302. Moreover, any or all parts of the API 312 and/or the service layer 313 may be implemented as child or sub-modules of another software module or hardware module, without departing from the scope of this disclosure.

The computer 302 includes an interface 304. Although illustrated as a single interface 304 in FIG. 3, two or more interfaces 304 may be used according to particular needs, configurations, or particular implementations of the computer 302. The interface 304 is used by the computer 302 for communicating with other systems in a distributed environment connected to the network 350 (whether illustrated or not). Generally, the interface 304 comprises logic encoded in software and/or hardware in a suitable combination and operable to communicate with the network 350. More specifically, the interface 304 may comprise software supporting one or more communication protocols associated with communications such that the network 350 or interface's hardware are operable to communicate physical signals.

The computer 302 includes a processor 305. Although illustrated as a single processor 305 in FIG. 3, two or more processors may be used according to particular needs, configurations, or particular implementations of the computer 302. Generally, the processor 305 executes instructions and manipulates data to perform the operations of the computer 302. In some cases, the processor 305 can include a data processing apparatus.

The computer 302 also includes a memory 306 that holds data for the computer 302. Although illustrated as a single memory 306 in FIG. 3, two or more memories may be used according to particular needs, configurations, or particular implementations of the computer 302. While memory 306 is illustrated as an integral component of the computer 302, in alternative implementations, memory 306 can be external to the computer 302.

The application 307 comprises an algorithmic software engine providing functionality according to particular needs, configurations, or particular implementations of the computer 302. Although illustrated as a single application 307, the application 307 may be implemented as multiple applications 307 on the computer 302. In addition, although illustrated as integral to the computer 302, in alternative implementations, the application 307 can be external to the computer 302.

There may be any number of computers 302 associated with, or external to, the system 300 and communicating over network 350. Further, the terms "client," "user," and other appropriate terminology may be used interchangeably, as appropriate, without departing from the scope of this disclosure. Moreover, this disclosure contemplates that many users may use one computer 302, or that one user may use multiple computers 302.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM), or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media, transitory or non-transitory, suitable for storing computer program instructions and data include all forms of non-volatile memory, media and memory devices, including by way of example, semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/–R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to, or represent, the functions of the web browser.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a transitory or non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A computer-implemented method, comprising:
   scanning, by at least one hardware processor, a set of binary software code in an executable binary code form to identify one or more network addresses accessed by the set of binary software code, wherein the scanning comprises:
      scanning a byte stream of the set of binary software code to identify binary numbers that correspond to text characters based on a text encoding protocol;
      identifying one or more text strings represented by the binary numbers; and
      identifying the one or more network addresses corresponding to the one or more text strings;
   for each of the one or more network addresses: determining, by the at least one hardware processor, security level information of the respective network address, wherein the determining comprises:
      transmitting an access request to the respective network address, wherein the access request comprises an Internet Control Message Protocol (ICMP) echo request;
      receiving an access response from the respective network address, wherein the access response comprises an ICMP echo reply; and
      determining the security level information of the respective network address based on the ICMP echo reply; and
   generating, by the at least one hardware processor, a security notification based on the determined security level information for the one or more network addresses, wherein the security notification indicates a security risk of the set of binary software code.

2. The method of claim 1, wherein the security level information of the respective network address is determined based on whether the access response comprises a redirect command.

3. The method of claim 1, wherein the security level information of the respective network address is determined based on security configuration information received from the respective network address.

4. The method of claim 3, wherein the security level information is determined based on comparing the security configuration information with a security policy.

5. The method of claim 1, wherein the security level information of the respective network address is determined by retrieving previously determined security level information corresponds to the respective network address.

6. A server, comprising:
   at least one hardware processor; and
   one or more computer-readable storage media coupled to the at least one hardware processor and storing programming instructions for execution by the at least one hardware processor, wherein the programming instructions, when executed, cause the at least one hardware processor to perform operations comprising:
scanning, by the server, a set of binary software code in an executable binary code form to identify one or more network addresses accessed by the set of binary software code, wherein the scanning comprises:
    scanning a byte stream of the set of binary software code to identify binary numbers that correspond to text characters based on a text encoding protocol;
    identifying one or more text strings represented by the binary numbers; and
    identifying the one or more network addresses corresponding to the one or more text strings;
for each of the one or more network addresses: determining, by the server, security level information of the respective network address, wherein the determining comprises:
    transmitting an access request to the respective network address, wherein the access request comprises an Internet Control Message Protocol (ICMP) echo request;
    receiving an access response from the respective network address, wherein the access response comprises an ICMP echo reply; and
    determining the security level information of the respective network address based on the ICMP echo reply; and
generating, by the server, a security notification based on the determined security level information for the one or more network addresses, wherein the security notification indicates a security risk of the set of binary software code.

7. The server of claim 6, wherein the security level information of the respective network address is determined based on whether the access response comprises a redirect command.

8. The server of claim 6, wherein the security level information of the respective network address is determined based on security configuration information received from the respective network address.

9. The server of claim 8, wherein the security level information is determined based on comparing the security configuration information with a security policy.

10. The server of claim 6, wherein the security level information of the respective network address is determined by retrieving previously determined security level information corresponds to the respective network address.

11. One or more non-transitory computer-readable media containing instructions which, when executed, cause a computing device to perform operations comprising:
scanning, by at least one hardware processor, a set of binary software code in an executable binary code form to identify one or more network addresses accessed by the set of binary software code, wherein the scanning comprises:
    scanning a byte stream of the set of binary software code to identify binary numbers that correspond to text characters based on a text encoding protocol;
    identifying one or more text strings represented by the binary numbers; and
    identifying the one or more network addresses corresponding to the one or more text strings;
for each of the one or more network addresses: determining, by the at least one hardware processor, security level information of the respective network address, wherein the determining comprises:
    transmitting an access request to the respective network address, wherein the access request comprises an Internet Control Message Protocol (ICMP) echo request;
    receiving an access response from the respective network address, wherein the access response comprises an ICMP echo reply; and
    determining the security level information of the respective network address based on the ICMP echo reply; and
generating, by the at least one hardware processor, a security notification based on the determined security level information for the one or more network addresses, wherein the security notification indicates a security risk of the set of binary software code.

12. The one or more computer-readable media of claim 11, wherein the security level information of the respective network address is determined based on whether the access response comprises a redirect command.

13. The one or more computer-readable media of claim 11, wherein the security level information of the respective network address is determined based on security configuration information received from the respective network address.

14. The one or more computer-readable media of claim 13, wherein the security level information is determined based on comparing the security configuration information with a security policy.

\* \* \* \* \*